United States Patent [19]
Lutes

[11] 3,889,659
[45] June 17, 1975

[54] DIGITAL ELECTROCARDIOGRAPH INTERPRETER

[76] Inventor: Bill N. Lutes, 3637 Pine Ave., Long Beach, Calif. 90807

[22] Filed: Dec. 5, 1973

[21] Appl. No.: 421,785

[52] U.S. Cl........ 128/2.06 A; 128/2.06 G; 324/188; 346/14 R
[51] Int. Cl............................................. A61b 5/04
[58] Field of Search ..... 128/2.06 A, 2.06 F, 2.06 G, 128/2.06 R; 324/181, 188; 346/14 R, 14 MR, 346/16, 17, 33 MG

[56] References Cited
UNITED STATES PATENTS

| | | | |
|---|---|---|---|
| 3,384,075 | 5/1968 | Mitchell | 128/2.06 F |
| 3,554,187 | 1/1971 | Glassner et al. | 128/2.06 A |
| 3,599,628 | 8/1971 | Abbenante et al. | 128/2.06 F |
| 3,606,882 | 9/1971 | Abe et al. | 128/2.06 A |

*Primary Examiner*—William E. Kamm
*Attorney, Agent, or Firm*—William C. Babcock

[57] ABSTRACT

A device and method of using the same that may be connected in parallel with the recorder pen drive coil of an electrocardiograph assembly to obtain a visual digital display of the time interval of selected portions of the wave forms in an EKG signal along the X axis thereof. The device eliminates the necessity of an electrocardiologist physically measuring the length of the wave forms on a pen recorded graph of an EKG and then computing the time interval in which this wave form or group of wave forms was produced by a patient.

The device permits direct measurement of the heart's electrochemical action in the time domain, with the R wave being used for real time correlation, and the device permitting a conventional electrocardiograph assembly to operate concurrently in a normal manner to obtain a pen recorded graph of an EKG signal on a moving strip of paper.

3 Claims, 9 Drawing Figures

DIGITAL ELECTROCARDIOGRAPH INTERPRETER

BACKGROUND OF THE INVENTION

1. Field of the Invention

Digital electrocardiograph interpreter.

2. Description of the Prior Art

For a number of years it has been known that the expansions and contractions of the cardiac muscle produce electrical signals that circulate upon the body portion of the surface of the patient's skin. These signals, which can be sensed by properly positioning electrodes on the surface of the skin, are the so-called electrocardiac or EKG signals. The wave forms of these signals to a highly trained person such as an electrocardiologist indicate certain characteristics of the heart. From experience it has been found that the time interval of the wave forms on an electrocardiogram are of great importance, and particularly the time required to form such wave patterns both individually and in combination along the X axis.

In the past, it has been common practice to record the EKG signals by a moving pen on an elongate strip of paper that also moves with the time duration required in forming the various wave forms being determined. The electrocardiologist physically measuring the length thereof and then computing the time required to form the same. Obviously, such an interpretation is not only tedious and time consuming, but is subject to human error.

The primary purpose in devising the present invention is to supply a device that may be operatively associated with a conventional electrocardiograph to provide a direct visual digital readout of the time required to form a desired portion of the wave forms of an EKG signal along the X axis thereof, and yet permit the electrocardiograph to operate in a normal manner to provide a pen recorded replica of the EKG signal on an elongate moving strip of paper.

SUMMARY OF THE INVENTION

The digital interpreter is connected in parallel across the chart recorder pen drive coil of a conventional electrocardiograph or signal output connector if available. An isolation amplifier and 60 Hz notch filter are used to isolate the digital interpreter from the electrocardiograph and remove 60 Hz noise pickup. A first portion of the filtered signal is then peak clipped to provide the basic time pulse for real time correlation with the patient's heart beat, and is a signal referred to by the letter R'. A second portion of the filtered signal is passed through an integration amplifier for further noise reduction. The second portion of the signal is then modified by an absolute amplifier to invert the Q and S waves and then by an overdrive amplifier the wave forms of the signal are squared. This video signal is then differentiated and used to step a four bit counter.

The output of the four bit counter is gated, with the gating being controlled by manual selection means. This time gate controls the output from a one-thousandth second pulse generator into a three decade counter. Output from the counter is transferred into a holding register just prior to the peak waves by a pulse which is generated by delaying the R' signal. After transfer, this counter is clear to await the next time gate pulse train. The holding register output is multiplexed and the time required for a desired portion of the EKG signal to form along the X axis thereof is displayed on three digital display tubes as shown in FIG. 1.

DESCRIPTION OF THE PREFERRED EMBODIMENT

Figure 1:
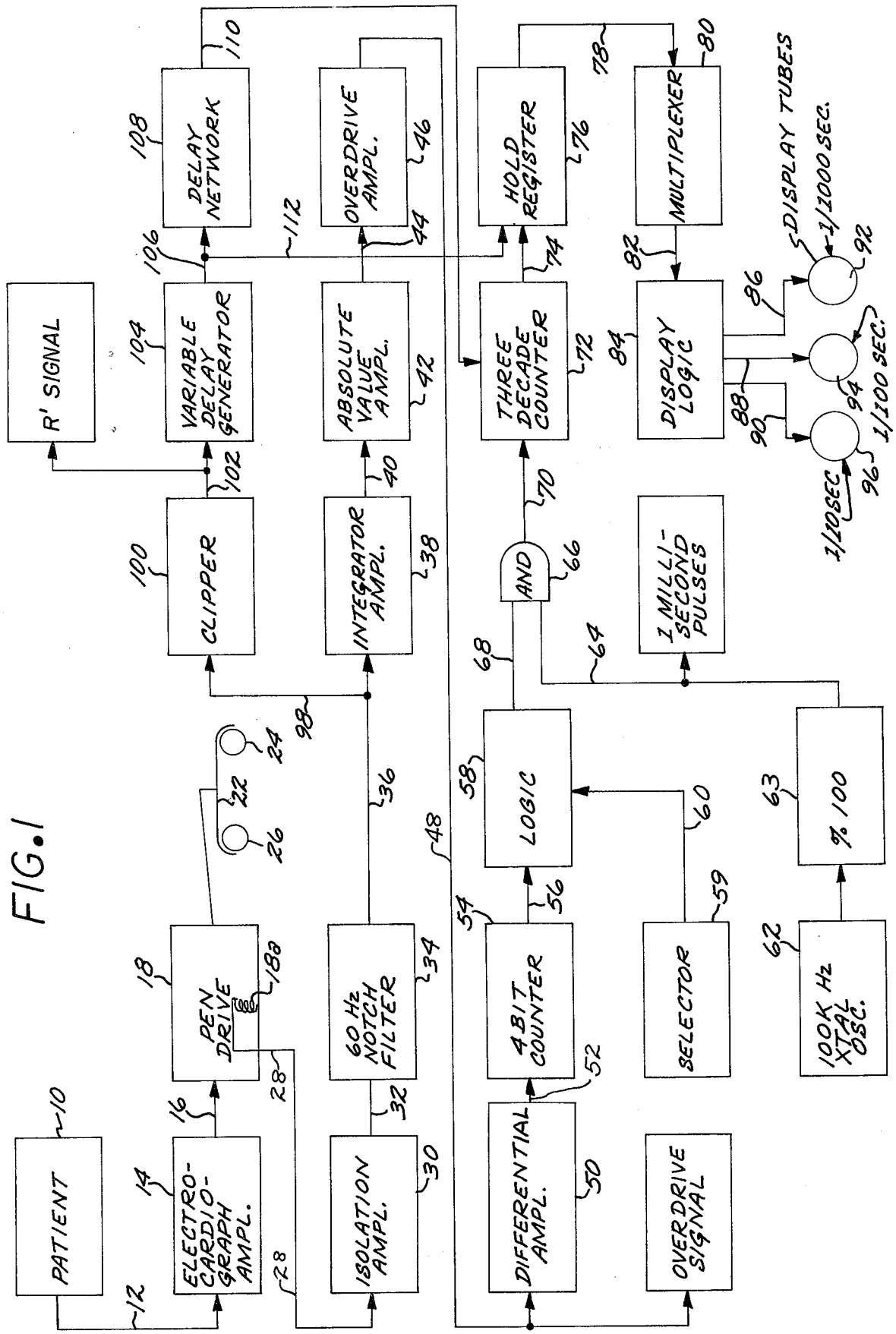
FIG. 1 is a diagrammatic view of the digital electrocardiograph interpreter.
Figure 2:
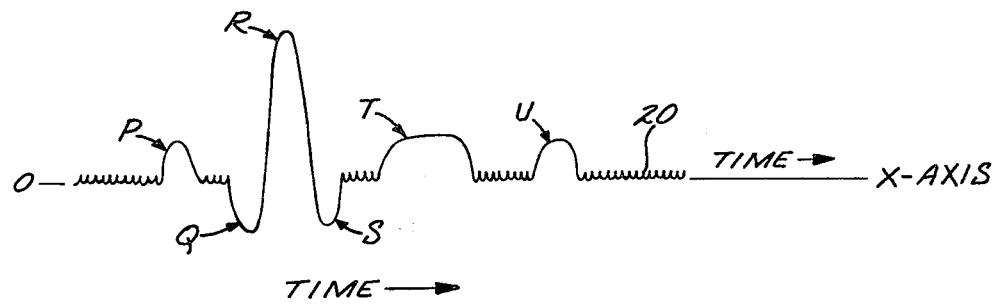
FIG. 2 is a typical electrocardiograph signal.

In FIG. 1 it will be seen that a patient 10 is by electrical conducting means 12 connected to a conventional electrocardiograph amplifier assembly 14 that discharges an electric signal through electrical conducting means 16 to energize an electric coil 18a that forms a part of a movable pen drive 18. The movable pen drive 18 visually records an electrocardiograph signal 20, of the type shown in FIG. 2 on elongate strips of paper 22 as the latter moves from a first roll 24 to a second driven roll 26. A typical electrocardiograph signal 20 is shown in FIG. 2.

The typical or classical electrocardiograph signal 20 normally referred to as the EKG signal includes in the following sequence, a P wave, a Q, R, S complex, a T wave and a U wave. The P wave is normally a small positive pulse that corresponds to the initial impulse that triggers the commencement of the heartbeat. Shortly after the P wave, there is a quiescent portion that separates the P wave from the Q, R, S complex, and has a time duration of approximately 0.04 seconds. The portion is of a substantially uniform amplitude. The Q, R, S complex which is substantially coincident with the actual expansion and contraction of the cardiac muscles producing the pumping action, commences and terminates with the so-called Q and S waves respectively. These waves are generally relatively small negative pulses and are separated from each other by the intervening R wave. The R wave, which is the most conspicuous portion of the EKG signal has the appearance of a positive spike. The P wave normally represents a substantial ending of the heartbeat, although in the signal 20 it will be shown that there may be a U-wave subsequent thereto.

After the U wave if present, or T if not present, the following EKG signal 20 occurs as indicated by the commencement of a succeeding P wave. In interpreting the electrocardiograph signal as shown in FIG. 2, it has been found that the time required for the waves P and T to form along the X axis thereof are of the utmost importance, as is the time duration of the Q, R, S complex. Also, the time interval required for these waves to form both individually and in combination with one another has been found to be of importance.

Figure 3A:
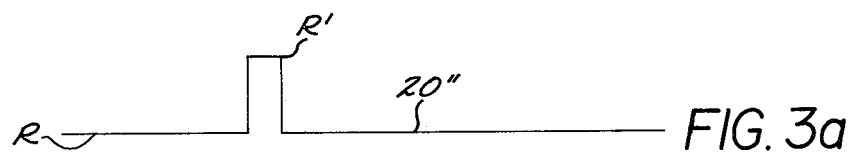
FIG. 3a is the signal shown in FIG. 2 after it has been filtered and clipped to provide the R' signal to provide real time correlation with the patient's heart beat.
Figure 3B:
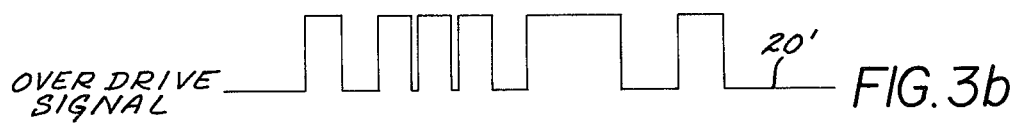
FIG. 3b is the signal shown in FIG. 2 after the same has been amplified, filtered, and modified by an absolute amplifier to invert the Q- and S-waves, and then squared to provide the overdrive video signal.
Figure 3C:
FIG. 3c is a selected P' portion of the video signal shown in FIG. 3b.
Figure 3D:
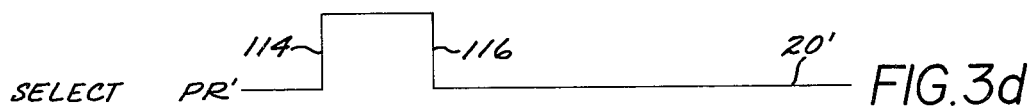
FIG. 3d is a selected PR' portion of the signal shown in FIG. 3b.
Figure 3E:
FIG. 3e is a selected QRS' portion of the signal shown in FIG. 3b.
Figure 3F:
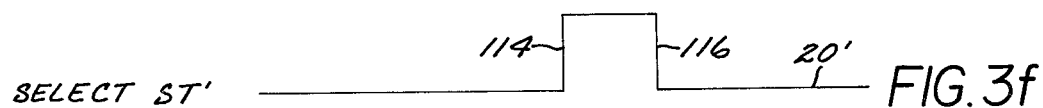
FIG. 3f is a selected ST' portion of the signal shown in FIG. 3b.
Figure 3G:
FIG. 3g is a selected QT' portion of the signal shown in FIG. 3b.

Electrical conducting means 28 are connected in parallel to the actuating coil 18a of the pen drive 18 and transmit the electrocardiograph signal to an isolation amplifier 30 that is connected by electrical conducting means 32 to a 60 Hz notch filter 34. The filter 34 serves to remove 60 Hz noise pickup which may originate from electrical wiring adjacent the patient. The signal discharging from the filter 34 is divided into first and second portions, with the first signal portion flowing through electrical conducting means 36 to an integrator amplifier 38 for the purpose of noise reduction, and then through electrical conducting means 40 to an absolute value amplifier that serves to invert the Q and S waves in the signal 20. The first signal portion as it discharges from the absolute value amplifier 42 flows through electrical conducting means 44 to an overdrive amplifier 46 where the waves in the signal 20 are squared. The first signal portion discharged from the overdrive amplifier 42 flows through electrical conducting means 44 to an overdrive amplifier 46 where the waves in the signal 20 are squared. The first signal portion discharged from the overdriven amplifier 46 through electrical conducting means 48 will be in the squared overdrive form 20' as shown in FIG. 3b.

The first signal portion in the electrical conducting means 48 is directed to a differential amplifier 50, and this amplifier in turn discharging a signal through electrical conducting means 52 to a four bit counter 54. The output of the four bit counter 54 is directed through electrical conducting means 56 to a logic assembly 58 that is controlled by a manually operated selector 59 through means 60.

An electric oscillator 62 in FIG. 1 continuously discharges one millisecond electrical pulses through unit 63 and electrical conducting means 64 to one terminal of an and-gate 66. The logic assembly 58 is capable of directing signals of the same polarity as those from the oscillator to the "and" gate 66 through electrical conducting means 68. Such signals will be directed through the electrical conducting means 68 for a desired portion of the overdrive video signal 20', and when the electrical conducting means 68 is so operating, one millisecond electrical impulses will flow from the and-gate 66 through electrical conducting means 70 to a three decade counter 72. Signals from the three decade counter 72 are transmitted through electrical conducting means 74 to a holding register 76, and the output from the holding register 76 being directed through electrical conducting means 78 to a multiplexer 80. The output of the multiplexer 80 is directed through electrical conducting means 82 to a conventional display logic unit 84, which by first, second and third electrical conducting means 86, 88 and 90 causes first, second and third tubes 92, 94 and 96 to display individual numbers that indicate the time duration of the forming of a selected portion of the video overdrive signal 20' along the X axis thereof. The numerals displayed on the first, second and third tube, 92, 94 and 96 are for one thousandths of a second one hundredths of a second, and one tenth of a second.

The signal 20 shown in FIG. 2 is repeated in succession. To prevent overlap of portions of the EKG signals, a second portion of the filtered signal is directed through electrical conducting means 98 from electrical conducting means 36 to a clipper 100 that transforms the electric signal into the form 20" as shown in FIG. 3a that includes the R' signal. The second signal portion 20" is directed by electrical conducting means 102 to a variable delay generator 104 from which it is discharged through an electrical conducting means 106 to a delay network 18. The delay network 108 is connected by electrical conducting means 110 to the three decade counter 72 as shown in FIG. 1. The signal from the delay network 118 flows through the electrical conducting means 110 to the three decade counter 72 in such timed sequence, that the counter 72 delivers its output to the hold register 76 until just prior to the P wave of the following signal 20. Output from the variable delayed generator 104 to the hold register 76 is through electrical conducting means 112, that are connected to electrical conducting means 106. The hold register continues to receive and hold output from the counter 72 until it is cleared by a signal that flows thereto through electrical conducting means 112 prior to the transfer from the counter 72 being effected. By manual manipulation of the selector 59, it is possible to show on the digital display tubes 92, 94 and 96 the time duration between the leading edge 114 and trailing edge 116 of any desired portion of the wave forms illustrated in the overdrive video signal 20' illustrated in FIG. 3b, with portions of the signal of which the time interval is required being illustrated in FIGS. 3c, 3d, 3e, 3f and 3g.

The use and operation of the digital electrocardiograph interpreter has been explained previously in detail and need not be repeated.

I claim:

1. In combination with an electrocardiograph assembly that includes a solenoid-operated recorder pen drive coil that receives EKG electrical signals from a patient and visually records a graph thereof on an elongate strip of moving paper, a device for selectively displaying a digital form, the time interval required to form a selected wave or group of waves in said signal along the X axis thereof, said signal including P, R, T and U positive waves and Q and S negative waves, said device including:

a. an electrical conductor that receives the EKG electric signal from said solenoid that drives said recorder pen;
   b. first means that includes an isolation amplifier and filter for receiving said EKG signal from said electrical conductor and which filters electric signals therefrom that originate from a source of domestic electric power;
   c. second means for dividing the filtered EKG signal from said first means into first and second signal portions;
   d. third means that include an integrator amplifier, absolute value amplifier and overdriven amplifier for receiving said first signal portion and thereafter sequentially removing noise from said first signal portion, inverting the Q and S waves of said first signal portion, and squaring said P, Q, R, S, T and U waves to provide an overdriven signal;
   e. an and-gate having first and second inputs and an output;
   f. fourth means for continuously delivering spaced electric pulses of a first polarity to said first input;

g. fifth means that include a differential amplifier, a multiple bit counter, a logic unit and manually operated signal controlled by said overdriven signal for selectively delivering an electric signal of said first polarity to said second input during the time interval a predetermined and selected portion of said EKG signal is being formed;

h. a multiple decade counter that receives said spaced electric pulses from said output of said and-gate;

i. a hold register that receives the output from said multiple decade counter;

j. a multiplexer in electrical communication with said hold register;

k. first second and third display tubes that indicate by digits thereon, thousandths, hundredths and tenths of a second;

l. sixth means in electrical communication with said multiplexer and first, second and third display tubes, said sixth means being actuated by the output from said multiplexer to actuate said display tubes to visually indicate the time duration required to form said selected portion of said EKG signal;

m. seventh means for eliminating all but said R wave from said second signal portion;

n. eighth means for storing said R wave of said second signal as an electric pulse until just prior to the forming of the P wave of the following EKG signal;

o. ninth means for using a portion of said stored electric pulse to cause the information in said counter to be transferred to said register just prior to said P wave of the following EKG signal; and p. tenth means for using a portion of said stored electric pulse to clear said hold register prior to said information in said counter being transferred thereto.

2. A device as defined in claim 1 in which said fourth means includes an electric oscillator assembly that continuously delivers one milli-second electric pulses.

3. A device as defined in claim 1 in which said eighth (and ninth) means (include) is a variable delay generator. (and a delay network.)

* * * * *